United States Patent
Liu et al.

(10) Patent No.: US 11,634,879 B2
(45) Date of Patent: Apr. 25, 2023

(54) TOWER PACKER FOR PACKING CEMENT SLURRY OF JACKET

(71) Applicant: HENGXIANG TECHNOLOGY INC., LTD, Hebei (CN)

(72) Inventors: Baoquan Liu, Hebei (CN); Meiqin Ma, Hebei (CN); Jiande Tian, Hebei (CN); Jianbang Sun, Hebei (CN); Yasheng Zhang, Hebei (CN); Chengang Shi, Hebei (CN); Ting Yin, Hebei (CN); Dongze Zhang, Hebei (CN); Yongxiao Lei, Hebei (CN)

(73) Assignee: HENGXIANG TECHNOLOGY INC., LTD, Hebei (CN)

( * ) Notice: Subject to any disclaimer, the term of this patent is extended or adjusted under 35 U.S.C. 154(b) by 439 days.

(21) Appl. No.: 17/041,425

(22) PCT Filed: Jul. 3, 2019

(86) PCT No.: PCT/CN2019/094565
§ 371 (c)(1),
(2) Date: Sep. 24, 2020

(87) PCT Pub. No.: WO2020/244013
PCT Pub. Date: Dec. 10, 2020

(65) Prior Publication Data
US 2021/0324595 A1    Oct. 21, 2021

(30) Foreign Application Priority Data
Jun. 6, 2019  (CN) .......................... 201910491359.6

(51) Int. Cl.
F16J 15/34   (2006.01)
E02D 13/00   (2006.01)

(52) U.S. Cl.
CPC .............. *E02D 13/00* (2013.01); *F16J 15/34* (2013.01); *E02D 2450/00* (2013.01)

(58) Field of Classification Search
None
See application file for complete search history.

(56) References Cited

U.S. PATENT DOCUMENTS 2,720,011 A * 10/1955 Krupp .................... B64D 15/02
                                                    277/921
3,178,779 A *  4/1965 Clark ........................ B64C 1/14
                                                    220/232

(Continued)

FOREIGN PATENT DOCUMENTS

| CN | 1363743 A   | 8/2002 |
|----|-------------|--------|
| CN | 103998834 A | 8/2014 |
| CN | 204252112 U | 4/2015 |

*Primary Examiner* — Vishal A Patel
(74) *Attorney, Agent, or Firm* — Novick, Kim & Lee, PLLC; Allen Xue

(57) ABSTRACT

A tower packer for packing cement slurry of a jacket is disposed between a steel pile and an inner sleeve. It includes a supporting ring, sealing rings and a limiting ring. The supporting ring and the limiting ring are respectively installed on an outer surface of the inner sleeve in the steel pile. A plurality of sealing rings stacked from top to bottom along the sleeving direction of the inner sleeve are arranged between the supporting ring and the limiting ring. Each sealing ring is hermetically and slidably connected along a radial direction. The sealing ring at the bottom is always supported by the supporting ring. The sealing ring at the top abuts a lower surface of the limiting ring. When the inner sleeve is sleeved into the steel pile, the outer surface of the sealing ring with maximum outer diameter hermetically abuts the inner surface of the steel pile.

9 Claims, 5 Drawing Sheets

(56) References Cited

U.S. PATENT DOCUMENTS

| | | | | |
|---|---|---|---|---|
| 3,700,297 A | * | 10/1972 | Fickenwirth | F16C 11/0614 |
| | | | | 403/50 |
| 4,262,702 A | | 4/1981 | Streich | |
| 4,288,082 A | | 9/1981 | Setterberg, Jr. | |
| 5,209,498 A | * | 5/1993 | Colin | E04B 2/82 |
| | | | | 277/921 |
| 6,739,594 B2 | * | 5/2004 | Beeck | F16J 15/164 |
| | | | | 277/433 |
| 7,178,810 B1 | * | 2/2007 | Kuhary | F16J 15/061 |
| | | | | 277/921 |
| 7,552,769 B2 | | 6/2009 | Cherewyk | |
| 2015/0283870 A1 | * | 10/2015 | Drabon | F16F 1/26 |
| | | | | 280/124.171 |

* cited by examiner

TOWER PACKER FOR PACKING CEMENT SLURRY OF JACKET

TECHNICAL FIELD

The present invention belongs to the field of offshore jacket installation, and particularly relates to a tower packer for packing cement slurry of a jacket.

BACKGROUND

An offshore fixed platform is generally composed of a topside and a lower jacket. The fixation of the jacket and a seabed is generally completed by fixed connection between a sleeve placed at the bottom of a main leg of the jacket and a steel pile penetrated through the sleeve and driven into the seabed. The fixation between the inner diameter of the sleeve and the outer diameter of the pile is achieved by means of cement grouting.

According to different procedures of offshore construction operation, the construction of fixing jackets is divided into first piling operation and post piling operation. In the first piling operation, a seabed mud bed is directly piled and fixed according to a die frame, then the jacket is sleeved from the upper part of the steel pile into the steel pile, and the cement slurry is poured for connection and fixation. This operation mode is mainly suitable for the shallow sea areas, and has obvious advantages in the construction of large-scale same-size jackets. In the post piling operation, the jacket is placed at sea, and after the steel pile penetrates through the jacket sleeve, the jacket is fixed. This operation mode is mainly suitable for large-tonnage jackets, and is widely used in the deep sea areas. In the two construction operation modes for the offshore jacket, the fixed connection between the jacket and the steel pile is realized by bonding and fixing of cement slurry. Due to the peculiarity of offshore operation and the characteristic of easy flow of the cement slurry, a packer product needs to be arranged below an annular space between the steel pile and the sleeve to block the annular space therebetween to ensure that the cement slurry in the annular space does not flow out, avoid connection failure between the steel pile and the jacket, prevent the pollution of lower seabed sludge to the upper cement slurry and avoid influencing the solidification quality of the cement slurry. The main function of a marine underwater packer is to block the space between the inside of the annular sleeve and the outer diameter of the pile at the bottom of the sleeve when grouting after piling is completed, to prevent the cement slurry from flowing out. For a soft soil seabed, the packer itself or a matching device is needed to prevent mud on the seabed from entering the annular space between the outer diameter of the pile and the sleeve to ensure that the cement slurry is not polluted.

At present, the marine underwater packer is classified into an active packer and a passive packer according to the types of work. The active packer is mainly an inflatable packer. The inflatable packer has the following advantages: the inner surface of the inflatable packer does not come into contact with the outer surface of a column in the piling process; the inflatable packer is not limited by the weight of the cement slurry and water depth; the inflatable packer can allow reverse movement of the pile and moderate eccentricity of the pile; and the inflatable packer can withstand the vibration during piling and the impact load of the pile caused by the vertical movement of an offshore crane in the piling process. The inflatable packer has the disadvantage of complex system, and needs to be equipped with a power station, a hydraulic line and an underwater robot emergency interface. Once the line is damaged, an underwater robot is required to connect a hose. Land installation and commissioning are large in workload, high in cost, and complicated in offshore operation. Residual hardware consumes anodes, and the existence of the lines is harmful to the underwater operation of divers. The building cost is high.

The passive packer mainly includes a mechanical packer and a Crux packer. The passive packer has the following advantages: the lines, the power system and valve installation and underwater robot backup systems are not needed; land commissioning and offshore operations are not needed; at the same time, the role in blocking the mud from entering the annular space is played; no residual hardware consumes the anodes, and various lines and valves that are harmful to the underwater operation of the divers are not present; and the price is low. The passive packer has the main disadvantages: the application water depth is limited; and the rapid falling of the pile may cause damage and failure of the packer.

SUMMARY

In order to meet the requirement of the fixed connection between a jacket sleeve and a steel pile, the purpose of the present invention is to provide a tower packer for packing cement slurry of a jacket.

The Purpose of the Present Invention is Realized by the Following Technical Solution The tower packer of the present invention is located between the steel pile and an inner sleeve. The tower packer comprises a supporting ring, sealing rings and a limiting ring, wherein the supporting ring and the limiting ring are respectively installed on an outer surface of the inner sleeve in the steel pile; a plurality of sealing rings stacked from top to bottom along the sleeving direction of the inner sleeve are arranged between the supporting ring and the limiting ring; each of the sealing rings is hermetically and slidably connected along a radial direction; the sealing ring at the bottom is always supported by the supporting ring; the sealing ring at the top is always abutted against a lower surface of the limiting ring; in the process that the inner sleeve is sleeved into the steel pile, the outer surface of the sealing ring with maximum outer diameter is hermetically abutted against the inner surface of the steel pile, and the other sealing rings slide respectively to adapt along the radial direction as a distance between the outer surface of the inner sleeve and the inner surface of the steel pile is changed in the falling process of sleeving of the inner sleeve.

The number of the sealing rings is an odd number greater than 1, and the sealing rings are symmetrically arranged on an upper and a lower sides of the sealing ring with the maximum outer diameter.

The number of the sealing rings is an even number greater than 2; two sealing rings have the maximum outer diameter; and the other sealing rings are symmetrically arranged on the upper and the lower sides of the two sealing rings with the maximum outer diameter.

The number of the sealing rings is an even number greater than 2; one sealing ring has the maximum outer diameter; and the other sealing rings are respectively arranged on the upper and the lower sides of the sealing ring with the maximum outer diameter.

The widths of the sealing rings are equal; and the inner diameter of the sealing ring with the maximum outer diameter and the inner diameters of the other sealing rings on the upper or lower side are successively reduced in the form of arithmetic progression.

The tower packer of the present invention is located between an outer sleeve and the steel pile. The tower packer comprises a supporting ring, sealing rings and a limiting ring, wherein the supporting ring and the limiting ring are respectively installed on an inner surface of the outer sleeve; a plurality of sealing rings stacked from top to bottom along the penetration direction of the steel pile are arranged between the supporting ring and the limiting ring; each of the sealing rings is hermetically and slidably connected along a radial direction; the sealing ring at the bottom is always supported by the supporting ring; the sealing ring at the top is always abutted against a lower surface of the limiting ring; in the process that the steel pile penetrates into the outer sleeve, the inner surface of the sealing ring with minimum outer diameter is hermetically abutted against the outer surface of the steel pile, and the other sealing rings slide respectively to adapt along the radial direction as a distance between the outer surface of the steel pile and the inner surface of the outer sleeve is changed in the falling process of penetration of the steel pile.

The number of the sealing rings is an odd number greater than 1, and the sealing rings are symmetrically arranged on an upper and a lower sides of the sealing ring with the minimum outer diameter.

The number of the sealing rings is an even number greater than 2; two sealing rings have the minimum outer diameter; and the other sealing rings are symmetrically arranged on the upper and the lower sides of the two sealing rings with the minimum outer diameter.

The number of the sealing rings is an even number greater than 2; one sealing ring has the minimum outer diameter; and the other sealing rings are respectively arranged on the upper and the lower sides of the sealing ring with the minimum outer diameter.

The widths of the sealing rings are equal; and the inner diameter of the sealing ring with the minimum outer diameter and the inner diameters of the other sealing rings on the upper or lower side are successively increased in the form of arithmetic progression.

The maximum value of the width of each sealing ring, the maximum value of the width of the supporting ring and the maximum value of the width of the limiting ring are equal to a minimum distance value between the sleeve and the steel pile.

An annular waterproof skin is arranged above each sealing ring. The outer edge of the waterproof skin is hermetically connected to the inner surface of the limiting ring. The inner edge of the waterproof skin is hermetically connected to the sealing ring with the maximum outer diameter or hermetically connected to the sealing ring with the minimum outer diameter.

The Present Invention has the Advantages and Positive Effects that

1. The present invention can be applicable to two operating modes for the construction of fixed jackets in marine engineering, can overcome the defects of the prior art, and can improve the sealing capability and anti-destructive capability of the packer.

2. Each sealing ring of the present invention can slide along the radial direction to adapt to two states of normal pile or deviated pile.

3. The inner diameter of each sealing ring stacked on the supporting ring in the present invention is changed regularly, and an annular space between the sleeve and the steel pile is blocked on the premise of ensuring that the pile is not stuck.

4. The waterproof skins are arranged above the sealing rings in the present invention, which further improves the sealing performance of the packer.

In the figures: 1 tower packer; 2 inner sleeve; 3 steel pile; 4 supporting ring; 5 sealing ring; 6 sealing ring; 7 limiting ring; 8 waterproof skin; 9 sealing ring with maximum outer diameter; 10 sealing ring with minimum outer diameter; 11 outer sleeve; and 12 positioning tapered guide plate.

DETAILED DESCRIPTION

The present invention is further detailed below in combination with the drawings.

Embodiment 1 (First Piling Operation)

Figure 1:
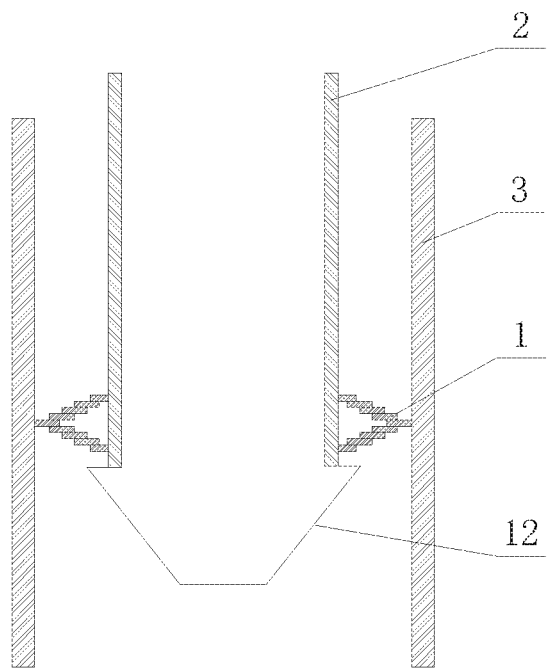
FIG. 1 is an operating state diagram of the present invention in a state of normal pile in a first piling construction environment of a jacket.
Figure 2:
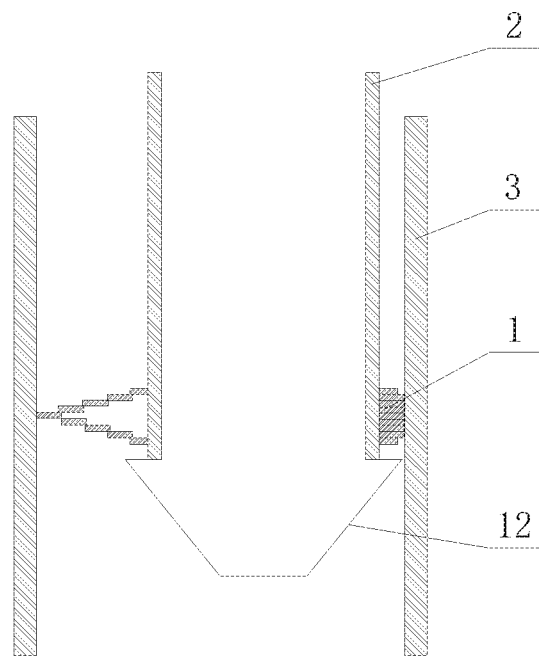
FIG. 2 is an operating state diagram of the present invention in a state of deviated pile in a first piling construction environment of a jacket.
Figure 3:
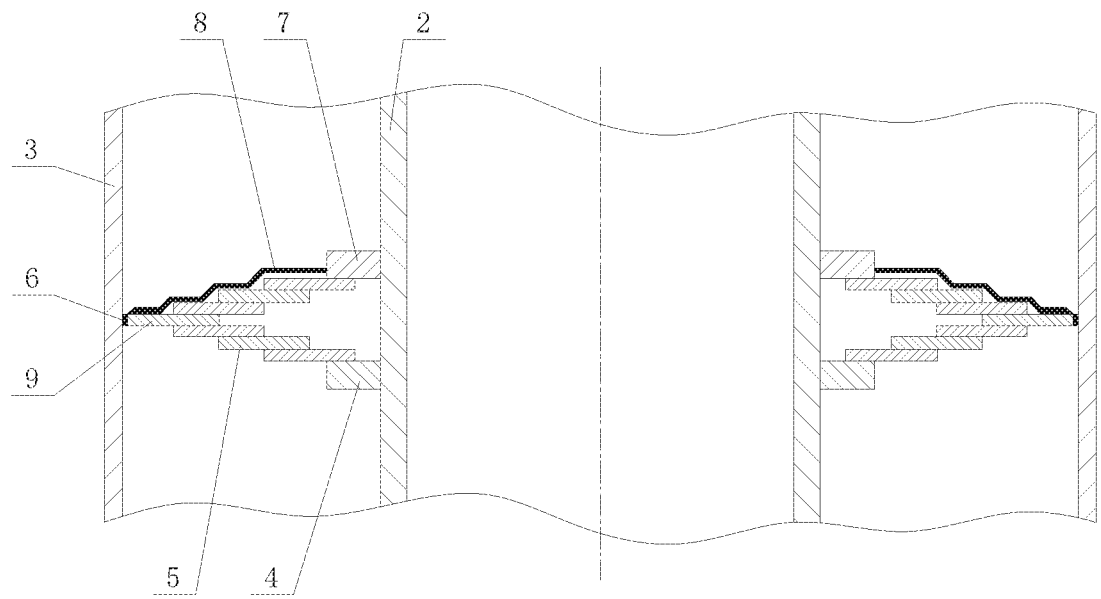
FIG. 3 is a structural sectional view of a structure of the present invention in a first piling construction environment of a jacket.

As shown in FIG. 1 to FIG. 3, a tower packer 1 of the present embodiment is located between a steel pile 3 and an inner sleeve 2. In the present embodiment, the piling operation construction is performed at first, that is, the steel pile 3 is fixed at first, and then the inner sleeve 2 is sleeved in the steel pile 3. The tower packer 1 comprises a supporting ring 4, sealing rings 5 and a limiting ring 7, wherein the supporting ring 4 and the limiting ring 7 are respectively fixed on an outer surface of the inner sleeve 2; the limiting ring 7 is located above the supporting ring 4; a plurality of sealing rings 5 stacked from top to bottom along the sleeving direction of the inner sleeve 2 are arranged between the supporting ring 4 and the limiting ring 7; each of the sealing rings 5 is sleeved on the inner sleeve 2 and is collinear with an axial centerline of the inner sleeve 2; each of the sealing rings 5 is hermetically and slidably connected along a radial direction; the sealing ring 5 at the bottom is always supported by the supporting ring 4; and the sealing ring 5 at the top is always abutted against a lower surface of the limiting ring 7. In the process that the inner sleeve 2 is sleeved into the steel pile 3, the outer surface of the sealing ring 9 with maximum outer diameter is hermetically abutted against the inner surface of the steel pile 3, and the other sealing rings 5 slide respectively to adapt along the radial direction as a distance between the outer surface of the inner sleeve 2 and the inner surface of the steel pile 3 is changed in the falling process of sleeving of the inner sleeve 2. In the process that each sealing ring 5 slides along the radial direction, adjacent sealing rings 5 are always partially overlapped. In order to facilitate the installation of the inner sleeve 2, a positioning tapered guide plate 12 is arranged at the lower end of the inner sleeve 2, and the positioning tapered guide plate 12 is located below the tower packer 1.

In the present embodiment, the number of the sealing rings 5 is an odd number greater than 1, and the sealing rings are symmetrically arranged on an upper and a lower sides of the sealing ring 9 with the maximum outer diameter. The widths of the sealing rings 5 are equal; and the inner diameter of the sealing ring 9 with the maximum outer diameter and the inner diameters of the other sealing rings 5 on the upper or lower side are successively reduced in the form of arithmetic progression. The maximum value of the width of each sealing ring 5, the maximum value of the width of the supporting ring 4 and the maximum value of the width of the limiting ring 7 are equal to a minimum distance value between the outer surface of the inner sleeve 2 and the inner surface of the steel pile 3. Specifically, in the present embodiment, seven sealing rings 5 are arranged, wherein the sealing ring 9 with the maximum outer diameter is located in the middle, and three sealing rings 5 are respectively arranged on the upper and the lower sides. In the present embodiment, the inner diameter of the steel pile 3 is φ2290 mm; the outer diameter of the inner sleeve 2 is φ1900 mm; the heights of the steel pile 3 and the inner sleeve 2 are 600 mm; each sealing ring 5 has a width of 80 mm and a height of 15 mm; the inner diameter of the sealing ring 9 with the maximum outer diameter is φ2140 mm; and by taking three sealing rings 5 on one side as an example, the inner diameters are successively φ2070 mm, φ2000 mm, and φ1930 mm. The material of the sealing rings 5 is rigid, such as iron or glass steel. A rubber sealing ring 6 is arranged on the outer surface of the sealing ring 9 with the maximum outer diameter. In the falling process of the inner sleeve 3, the sealing ring 6 is always hermetically abutted against the inner surface of the steel pile 3.

An annular waterproof skin 8 is arranged above each sealing ring 5. The inner edge of the waterproof skin 8 is hermetically connected to the outer surface of the limiting ring 7. The outer edge of the waterproof skin 8 is hermetically connected to the sealing ring 9 with the maximum outer diameter.

In the falling process of sleeving of the inner sleeve 2, in a state of normal pile shown in FIG. 1 (i.e., the inner sleeve 2 is collinear with the axial centerline of the steel pile 3), the sealing ring 6 arranged on the outer surface of the sealing ring 9 with the maximum outer diameter is always hermetically abutted against the inner surface of the steel pile 3; and the annular space between the inner sleeve 2 and the steel pile 3 is blocked to ensure that the cement slurry in the annular space may not flow out and simultaneously prevent the seabed sludge on the lower part of the tower packer 1 from polluting the upper cement slurry. In a state of deviated pile shown in FIG. 2 (i.e., the inner sleeve 2 is not collinear with the axial centerline of the steel pile 3), in the falling process of sleeving of the inner sleeve 2, except the sealing ring 9 with the maximum outer diameter, the outer surfaces of the other sealing rings 5 come into contact with the inner surface of the steel pile 3 and then slide along the radial direction to adapt to the change of the distance between the inner sleeve 2 and the steel pile 3.

Embodiment 2 (First Piling Operation)

Figure 4:
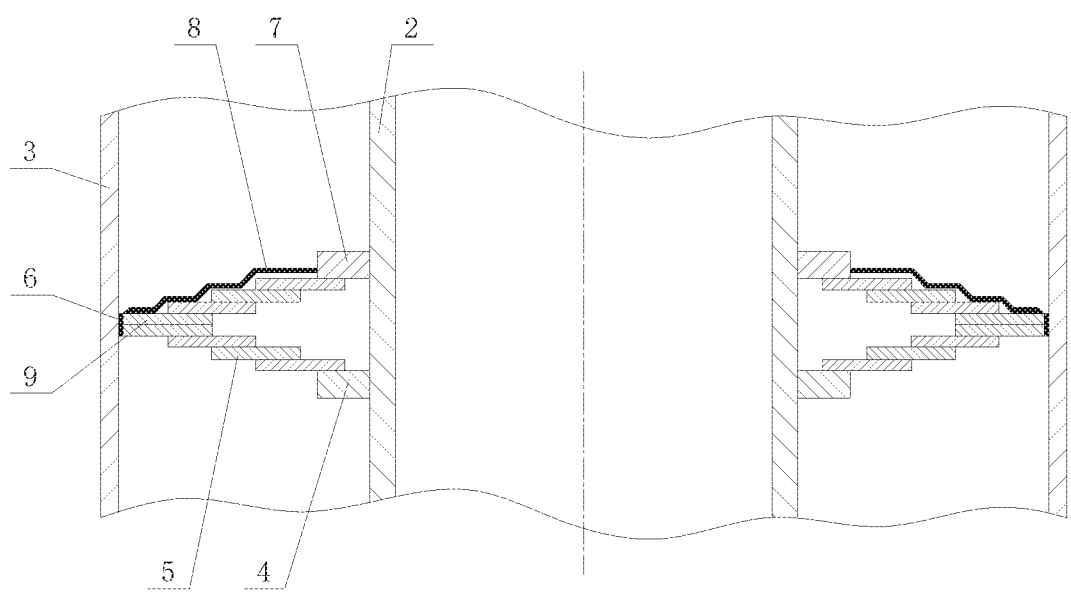
FIG. 4 is a structural sectional view of another structure of the present invention in a first piling construction environment of a jacket.

As shown in FIG. 1, FIG. 2 and FIG. 4, the differences between the present embodiment and embodiment 1 are: the number of the sealing rings 5 in the present embodiment is an even number greater than 2; two sealing rings 9 have the maximum outer diameter; and the other sealing rings 5 are symmetrically arranged on the upper and the lower sides of the two sealing rings 9 with the maximum outer diameter. Specifically, in the present embodiment, eight sealing rings 5 are arranged, wherein the two sealing rings 9 with the maximum outer diameter are stacked up and down and located in the middle, and three sealing rings 5 are respectively arranged on the upper and the lower sides. Others are the same as those in the embodiment 1.

Embodiment 3 (First Piling Operation)

Figure 5:
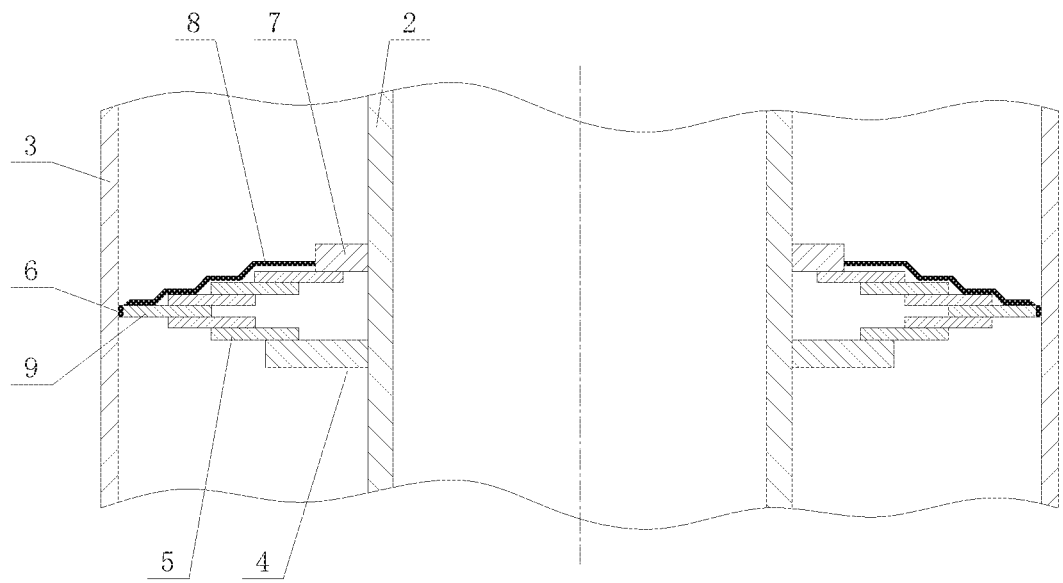
FIG. 5 is a structural sectional view of still another structure of the present invention in a first piling construction environment of a jacket.

As shown in FIG. 1, FIG. 2 and FIG. 5, the differences between the present embodiment and embodiment 1 are: the number of the sealing rings 5 in the present embodiment is an even number greater than 2; one sealing ring 9 has the maximum outer diameter; and the other sealing rings 5 are respectively arranged on the upper and the lower sides of the sealing ring 9 with the maximum outer diameter. Specifically, in the present embodiment, six sealing rings are arranged, wherein three sealing rings 5 are arranged above the sealing ring 9 with the maximum outer diameter, and two sealing rings 5 are arranged below the sealing ring 9 with the maximum outer diameter. Because only two sealing rings 5 are arranged on the lower part, the width of the supporting ring 4 in the present embodiment is increased to ensure that the lowermost sealing ring 5 is always supported by the supporting ring 4, i.e., always partially overlapped with the supporting ring; and the width of the supporting ring 4 may not cause sticking of the pile. Others are the same as those in the embodiment 1.

Embodiment 4 (Post Piling Operation)

Figure 6:
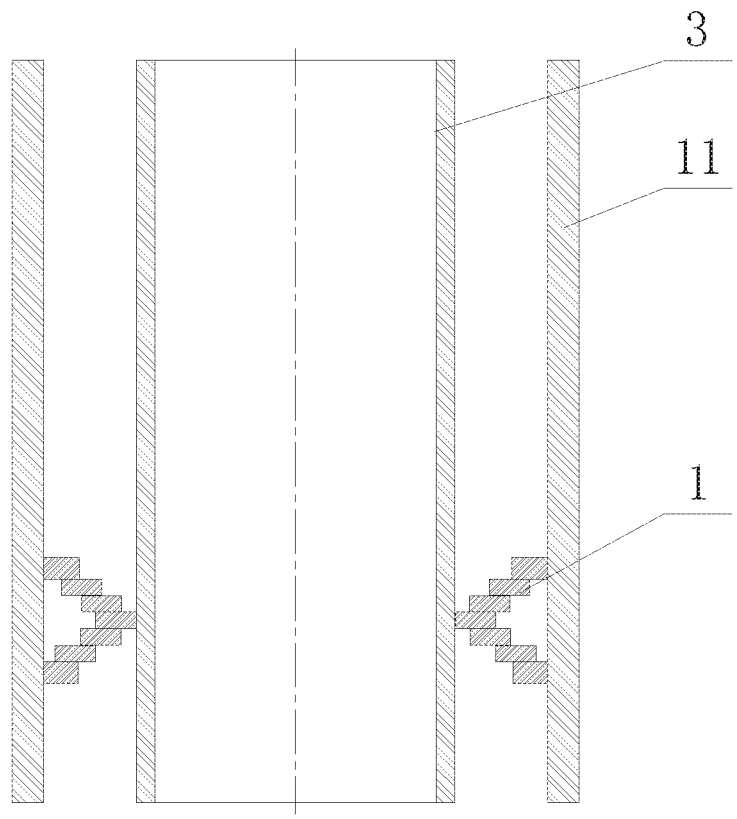
FIG. 6 is an operating state diagram of the present invention in a state of normal pile in a post piling construction environment of a jacket.
Figure 7:
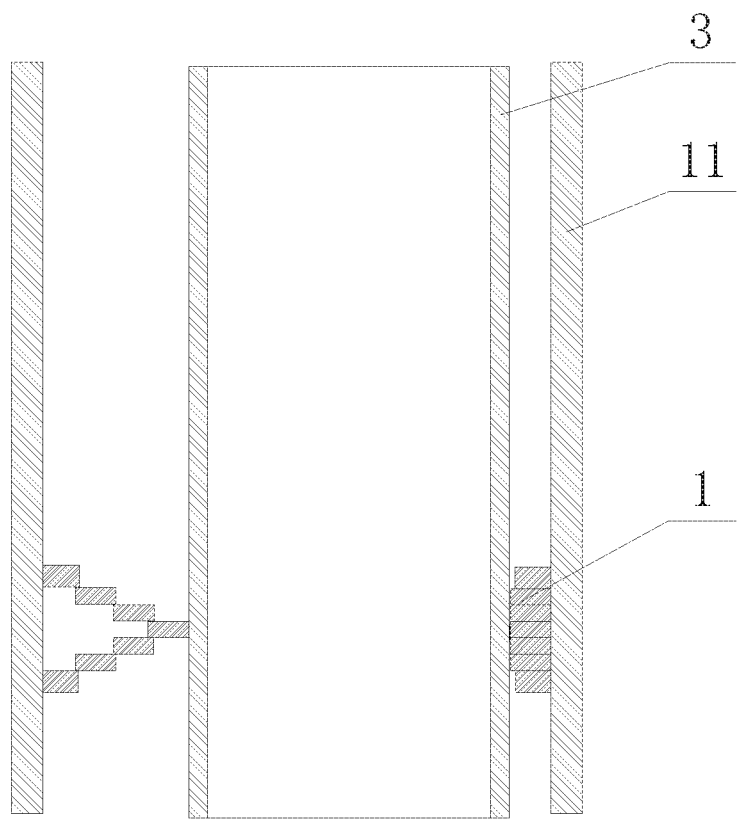
FIG. 7 is an operating state diagram of the present invention in a state of deviated pile in a post piling construction environment of a jacket.
Figure 8:
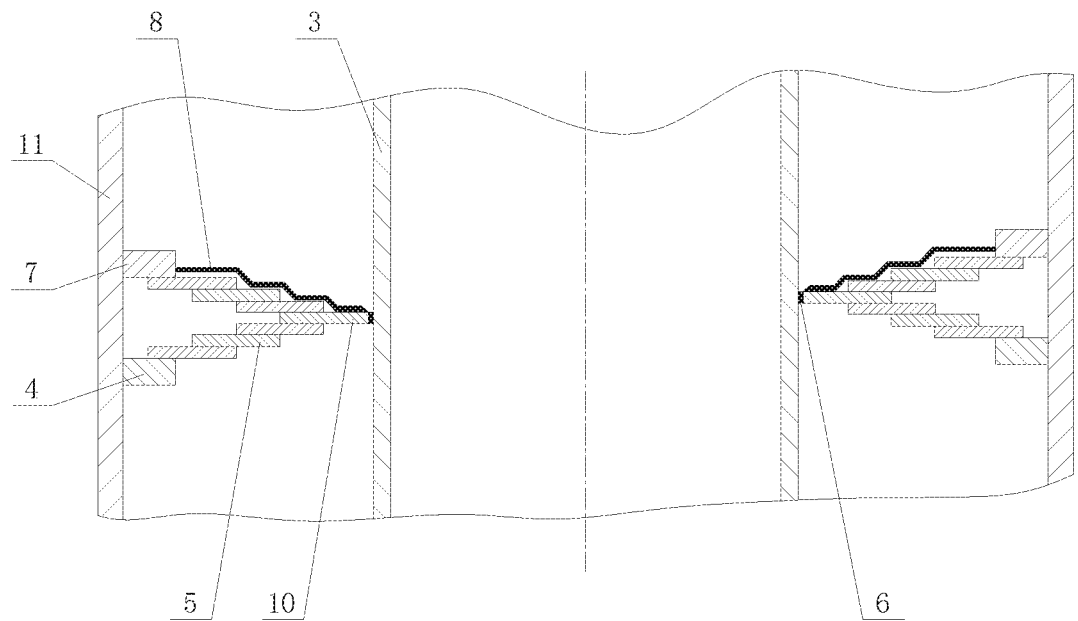
FIG. 8 is a structural sectional view of a structure of the present invention in a post piling construction environment of a jacket.

As shown in FIG. 6 to FIG. 8, a tower packer 1 of the present embodiment is located between an outer sleeve 11 and a steel pile 3. In the present embodiment, the piling operation construction is performed later, that is, a jacket is firstly put in place at sea, and then is fixed after the steel pile 3 penetrates through the outer sleeve 11 on the jacket. The tower packer 1 comprises a supporting ring 4, sealing rings 5 and a limiting ring 7, wherein the supporting ring 4 and the limiting ring 7 are respectively fixed on an inner surface of the outer sleeve 11; the limiting ring 7 is located above the supporting ring 4; a plurality of sealing rings 5 stacked from top to bottom along the penetration direction of the steel pile 3 are arranged between the supporting ring 4 and the limiting ring 7; each of the sealing rings 5 is sleeved on the steel pile 3 and is collinear with an axial centerline of the steel pile 3; each of the sealing rings 5 is hermetically and slidably connected along a radial direction; the sealing ring 5 at the bottom is always supported by the supporting ring 4; and the sealing ring 5 at the top is always abutted against a lower surface of the limiting ring 7. In the process that the steel pile 3 penetrates into the outer sleeve 11, the inner surface of the sealing ring 10 with minimum outer diameter is hermetically abutted against the outer surface of the steel pile 3, and the other sealing rings 5 slide respectively to adapt along the radial direction as a distance between the outer surface of the steel pile 3 and the inner surface of the outer sleeve 11 is changed in the falling process of penetration of the steel pile 3. In the process that each sealing ring 5 slides along the radial direction, adjacent sealing rings 5 are always partially overlapped.

In the present embodiment, the number of the sealing rings 5 is an odd number greater than 1, and the sealing rings are symmetrically arranged on an upper and a lower sides of the sealing ring 10 with the minimum outer diameter. The widths of the sealing rings 5 are equal; and the inner diameter of the sealing ring 10 with the minimum outer diameter and the inner diameters of the other sealing rings 5 on the upper or lower side are successively increased in the form of arithmetic progression. The maximum value of the width of each sealing ring 5, the maximum value of the width of the supporting ring 4 and the maximum value of the width of the limiting ring 7 are equal to a minimum distance value between the inner surface of the outer sleeve 11 and the outer surface of the steel pile 3. Specifically, in the present embodiment, seven sealing rings 5 are arranged, wherein the sealing ring 10 with the minimum outer diameter is located in the middle, and three sealing rings 5 are respectively arranged on the upper and the lower sides. In the present embodiment, the inner diameter of the outer sleeve 11 is φ2290 mm; the outer diameter of the steel pile 3 is φ1900 mm; the heights of the steel pile 3 and the outer sleeve 11 are 600 mm; each sealing ring 5 has a width of 80 mm and a height of 15 mm; the inner diameter of the sealing ring 10 with the minimum outer diameter is φ1930 mm; and by taking three sealing rings 5 on one side as an example, the inner diameters are successively φ2000 mm, φ2070 mm, and φ2140 mm. The material of the sealing rings 5 is rigid, such as iron or glass steel. A rubber sealing ring 6 is arranged on the inner surface of the sealing ring 10 with the minimum outer diameter. In the falling process of penetration of the steel pile 3, the sealing ring 6 is always hermetically abutted against the outer surface of the steel pile 3.

An annular waterproof skin 8 is arranged above each sealing ring 5. The outer edge of the waterproof skin 8 is hermetically connected to the inner surface of the limiting ring 7. The inner edge of the waterproof skin 8 is hermetically connected to the sealing ring 10 with the minimum outer diameter.

In the falling process of penetration of the steel pile 3, in a state of normal pile shown in FIG. 6 (i.e., the outer sleeve 11 is collinear with the axial centerline of the steel pile 3), the sealing ring 6 arranged on the outer surface of the sealing ring 10 with the minimum outer diameter is always hermetically abutted against the outer surface of the steel pile 3; and the annular space between the outer sleeve 11 and the steel pile 3 is blocked to ensure that the cement slurry in the annular space may not flow out and simultaneously prevent the seabed sludge on the lower part of the tower packer 1 from polluting the upper cement slurry. In a state of deviated pile shown in FIG. 2 (i.e., the outer sleeve 11 is not collinear with the axial centerline of the steel pile 3), in the falling process of penetration of the steel pile 3, except the sealing ring 10 with the minimum outer diameter, the outer surfaces of the other sealing rings 5 come into contact with the outer surface of the steel pile 3 and then slide along the radial direction to adapt to the change of the distance between the outer sleeve 11 and the steel pile 3.

Embodiment 5 (Post Piling Operation)

Figure 9:
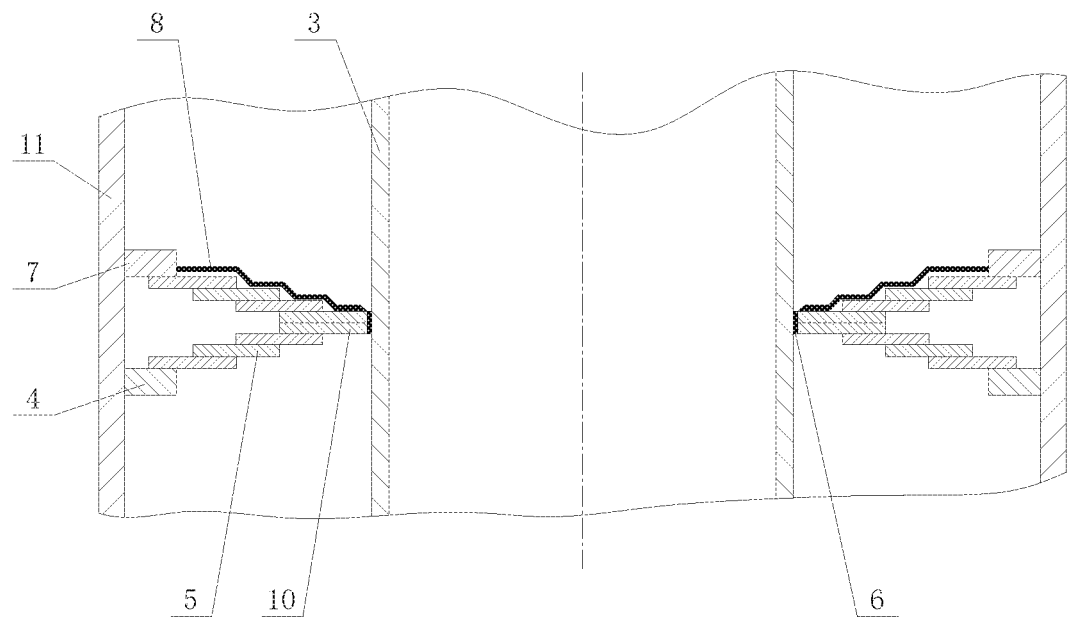
FIG. 9 is a structural sectional view of another structure of the present invention in a post piling construction environment of a jacket.

As shown in FIG. 6, FIG. 7 and FIG. 9, the differences between the present embodiment and embodiment 4 are: the number of the sealing rings 5 in the present embodiment is an even number greater than 2; two sealing rings 10 have the minimum outer diameter; and the other sealing rings 5 are symmetrically arranged on the upper and the lower sides of the two sealing rings 10 with the minimum outer diameter. Specifically, in the present embodiment, eight sealing rings 5 are arranged, wherein the two sealing rings 10 with the minimum outer diameter are stacked up and down and located in the middle, and three sealing rings 5 are respectively arranged on the upper and the lower sides. Others are the same as those in the embodiment 4.

Embodiment 6 (Post Piling Operation)

Figure 10:
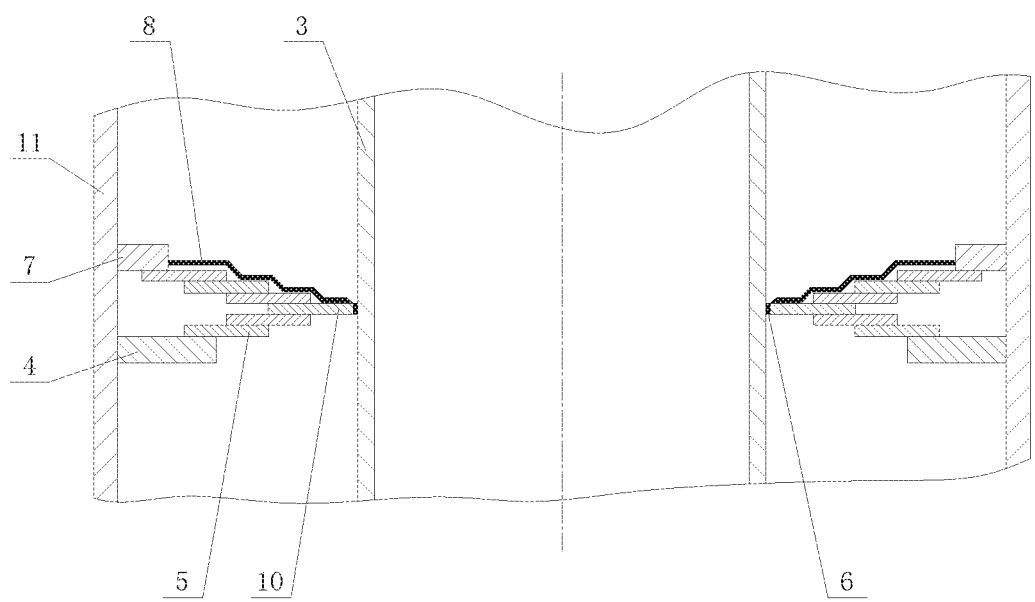
FIG. 10 is a structural sectional view of still another structure of the present invention in a post piling construction environment of a jacket.

As shown in FIG. 6, FIG. 7 and FIG. 10, the differences between the present embodiment and embodiment 4 are: the number of the sealing rings 5 in the present embodiment is an even number greater than 2; one sealing ring 10 has the minimum outer diameter; and the other sealing rings 5 are respectively arranged on the upper and the lower sides of the sealing ring 10 with the minimum outer diameter. Specifically, in the present embodiment, six sealing rings are arranged, wherein three sealing rings 5 are arranged above the sealing ring 10 with the minimum outer diameter, and two sealing rings 5 are arranged below the sealing ring 10 with the minimum outer diameter. Because only two sealing rings 5 are arranged on the lower part, the width of the supporting ring 4 in the present embodiment is increased to ensure that the lowermost sealing ring 5 is always supported by the supporting ring 4, i.e., always partially overlapped with the supporting ring; and the width of the supporting ring 4 may not cause sticking of the pile. Others are the same as those in the embodiment 4.

The present invention can be applicable to two operating modes for the construction of fixed jackets in marine engineering, can overcome the defects of the prior art, and can improve the sealing capability and anti-destructive capability of the packer.

The invention claimed is:

1. A tower packer for packing cement slurry of a jacket located between a steel pile and an inner sleeve, comprising:
   a supporting ring, a plurality of sealing rings, a waterproof skin, and a limiting ring, wherein the supporting ring and the limiting ring are installed on an outer surface of the inner sleeve in the steel pile,
   the plurality of sealing rings stacked from top to bottom along a sleeving direction of the inner sleeve are arranged between the supporting ring and the limiting ring,
   each of the plurality of sealing rings is hermetically and slidably connected along a radial direction,
   a bottom sealing ring at the bottom of the plurality of sealing rings is affixed to and supported by the supporting ring,
   a top sealing ring at the top of the stacked plurality of sealing rings is affixed to a lower surface of the limiting ring, and
   wherein, in operation, the inner sleeve is inserted into the steel pile, an outer surface of the sealing ring with a maximum outer diameter hermetically abuts against an inner surface of the steel pile, and the sealing rings between the top sealing ring and the bottom sealing ring slide to adapt along the radial direction as a distance between the outer surface of the inner sleeve and the inner surface of the steel pile changes, and wherein the waterproof skin is annular in shape, an outer edge of the waterproof skin is hermetically connected to the inner surface of the limiting ring, and an inner edge of the waterproof skin is hermetically connected to the sealing ring with the maximum outer diameter or hermetically connected to the sealing ring having a minimum outer diameter.

2. The tower packer for packing cement slurry of the jacket according to claim 1, wherein a number of the plurality of sealing rings is an odd number greater than 1, and an equal number of sealing rings are arranged above and below the sealing ring with the maximum outer diameter.

3. The tower packer for packing cement slurry of the jacket according to claim 1, wherein a number of the plurality of sealing rings is an even number greater than 2, two sealing rings have the maximum outer diameter, and an equal number of sealing rings are arranged above and below the two sealing rings with the maximum outer diameter.

4. The tower packer for packing cement slurry of the jacket according to claim 1, wherein a number of the sealing rings is an even number greater than 2, one sealing ring has the maximum outer diameter, and the remainder of the plurality of sealing rings are arranged on both sides of the sealing ring with the maximum outer diameter.

5. The tower packer for packing cement slurry of the jacket according to claim 2, wherein a difference between an outer diameter and an inner diameter of each of the plurality of sealing rings are equal; and an inner diameter of the sealing ring with the maximum outer diameter and the inner diameters of the remaining sealing rings on the upper or lower side are successively reduced in the form of arithmetic progression.

6. A tower packer for packing cement slurry of a jacket located between an outer sleeve and a steel pile, comprising:
a supporting ring, a plurality of sealing rings, a waterproof skin, and a limiting ring, wherein the supporting ring and the limiting ring are installed on an inner surface of the outer sleeve, the plurality of sealing rings are stacked from top to bottom along a penetration direction of the steel pile between the supporting ring and the limiting ring,
each of the plurality of sealing rings is hermetically and slidably connected along a radial direction,
a bottom sealing ring at the bottom of the stacked plurality of sealing rings is affixed to and supported by the supporting ring,
a top sealing ring at the top of the stacked plurality of sealing rings is affixed to a lower surface of the limiting ring,
wherein, when the steel pile inserts into the outer sleeve, an inner surface of the sealing ring with a minimum outer diameter is hermetically abuts against an outer surface of the steel pile, and the remainder of the plurality of sealing rings slide to adapt along the radial direction as a distance between the outer surface of the steel pile and the inner surface of the outer sleeve changes,
wherein the waterproof skin is annular in shape, an outer edge of the waterproof skin is hermetically connected to the inner surface of the limiting ring, and an inner edge of the waterproof skin is hermetically connected to the sealing ring having a maximum outer diameter or hermetically connected to the sealing ring having a minimum outer diameter.

7. The tower packer for packing cement slurry of the jacket according to claim 6, wherein a number of the plurality of sealing rings is an odd number greater than 1, and an equal number of sealing rings are arranged above and below the sealing ring with the minimum outer diameter.

8. The tower packer for packing cement slurry of the jacket according to claim 6, wherein a number of the sealing rings is an even number greater than 2, one sealing ring has the minimum outer diameter, and the remaining sealing rings are arranged on both sides of the sealing ring with the minimum outer diameter.

9. The tower packer for packing cement slurry of the jacket according to claim 7, wherein a difference between an outer diameter and an inner diameter of each of the plurality of sealing rings are equal; and an inner diameter of the sealing ring with the minimum outer diameter, and the inner diameters of the remainder of the plurality of sealing rings on the upper or lower side are successively reduced in the form of arithmetic progression.

\* \* \* \* \*